UNITED STATES PATENT OFFICE.

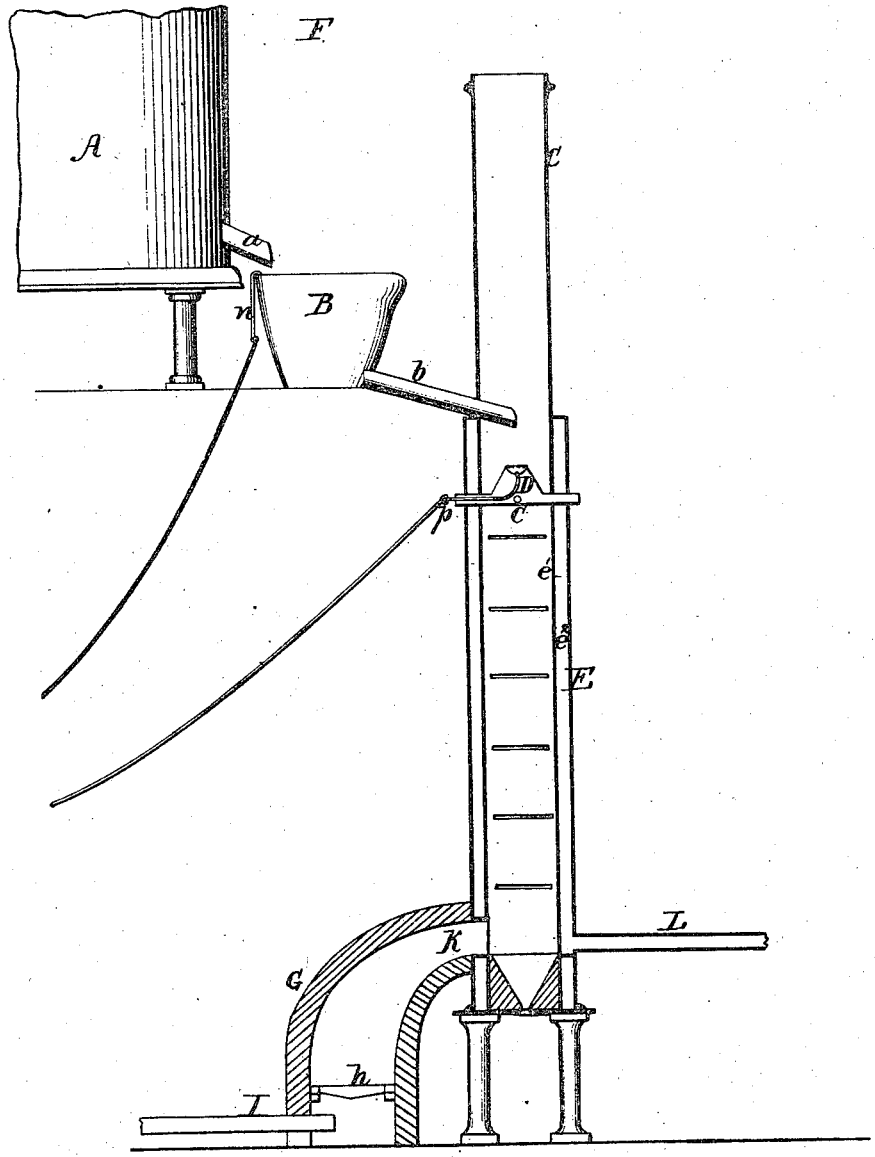

ALEXANDER HAMAR, OF PHILADELPHIA, PENNSYLVANIA, AND GEORGE H. SELLERS, OF WILMINGTON, DELAWARE.

IMPROVEMENT IN CONVERTING CAST-IRON INTO MALLEABLE IRON.

Specification forming part of Letters Patent No. 86,537, dated February 2, 1869.

*To all whom it may concern:*

Be it known that we, ALEXANDER HAMAR, formerly of New York city, but now residing in Philadelphia, in the State of Pennsylvania, and GEORGE H. SELLERS, formerly of Phœnixville, in the county of Chester and State of Pennsylvania, but now residing at Wilmington, in the State of Delaware, have invented certain new and Improved Methods of Converting Cast-Iron into Malleable Iron, of which the following is a full, clear, and exact description.

The object of the first part of our invention is to form good malleable iron by removing the impurities from the metal while in a molten state; to which end our improvement consists in a novel method of applying a current of electricity to a current of metal, whereby the foreign matters are effectually eliminated, as their affinity is for the negative pole of the battery, while that of the iron is equally strong for the opposite or positive pole.

Our invention further consists in a novel method of applying a current of electricity to a current of molten metal, to eliminate its impurities, and simultaneously subjecting the metal to a strong upward current of hot compressed air and hydrogen, or oxygen, or both combined, which gases combine with the freed carbon of the metal and consume it, while the oxygen at the same time oxidizes the silicates, and (together with the heat generated by the combustion of the carbon) burns off or vaporizes the sulphur, phosphorus, or arsenic eliminated from the iron by the electric current.

Our improvement further consists in a novel method of forming a bed or hearth for the bottom of the furnace in which the cast-iron is melted, of one volume of nitrate of soda, five volumes of charcoal, and enough lime slaked in water to form a stiff paste of the entire mass, whereby the iron is purified, as hereinafter explained.

The next part of our invention relates to an improved apparatus for carrying out the objects of our invention; and our improvement under this head consists in a novel method of combining a furnace to melt the iron, an insulated ladle to receive the molten metal, a stack through which the melted metal runs, and an electric battery or circuit, so arranged as to transmit its current through the metal during its descent.

Our invention further consists in a novel method of combining with the stack an adjustable scattering-cone, carrying an insulated wire.

Our invention further consists in a novel method of combining with the stack an annular blowing-chamber, provided with proper tuyeres to admit the blast.

The accompanying drawing, which exemplifies one practical mode of carrying out our invention, is a view, partly in elevation and partly in section, of so much of our improved converting apparatus as is necessary to illustrate our invention.

The iron to be converted is first melted in a cupola or air-furnace, A. Before charging this furnace its bottom is covered with a bed or hearth composed of the following ingredients, mingled in the proportions given, viz: Nitrate of soda, one volume; pulverized charcoal, five volumes; slaked lime, mixed with water, enough to form a thin paste. These ingredients are to be mixed into a stiff mortar, and spread over the hearth. When dry, the furnace is to be charged with coal and pig-iron, in the usual way. As the iron melts, the nitrate of soda evolves oxygen gas, which bubbles up through the molten metal, and purifies the iron by depriving it of its phosphorus and sulphur. The iron is also, by this process, deprived of a part of its carbon, but this loss is repaired by the carbon evolved from the charcoal. The lime acts as a flux, to some extent. We have found this much of our process beneficial in purifying iron without more.

To carry out the next part of our invention, the molten metal is run, at suitable periods, through a trough, *a*, into a ladle, B, electrically insulated in any proper well-known way, and connected with the magnetic pole of a strong battery by a wire, *n*.

We prefer to place in the ladle B pulverized hematite, or other pulverized oxides of iron, in the proportion of about one-twentieth of the volume of the iron that the ladle is to receive.

A spout, *b*, conducts the melted iron from the ladle into a stack, C, into which it falls, and is scattered into spray by a cone, D, secured on suitable bars c some distance below the top of the stack, and suitably protected from the heat by fire-clay or equivalent means.

This cone may be so constructed as to be raised or lowered, to regulate the scattering of the metal, (and also the length of time the metal is exposed to the current of electricity,) and is perforated, so as to receive the other or positive pole of the battery, the wire $p$, of which must, of course, be suitably insulated.

It will be seen that in our process the current of falling metal itself forms the connection between the two poles of the battery.

The stack C, in this instance, is formed of an outer casing, E, of iron, with an internal lining, $e^1$, of fire clay or brick, so arranged as to leave an annular space, $e^2$, between them. This space serves as a blowing-chamber, through which a blast of air, compressed under high pressure, (either hot or cold, hydrogen or oxygen,) is forced into the stack by numerous openings, $f$, at different elevations, by which means a continuous supply of fresh gases is secured, as hereinafter explained.

The hydrogen or oxygen of the blast encounters the falling metal just as it is chemically separated from its impurities by the electric current, and immediately unites with the carbon of the metal, forming carbureted hydrogen or oxygen, as the case may be, which, by its combustion, destroys or eliminates the other impurities of the iron. A small furnace, G, is placed near the bottom of the stack to heat it, and prevent chilling the iron. The fuel is placed on a grate, $h$. Mingled jets of steam and air are introduced into the furnace below the hearth through a pipe, I, from any proper blowing apparatus. The oxygen of the steam is consumed by the fire, and the remaining product (carbureted hydrogen) escapes up the stack through the opening K, and aids in purifying the iron. The blast is conducted to the furnace and stack through a pipe, L, in the usual way. The purified iron is run directly from the stack into molds to form ingots.

We find by experiment that we produce malleable iron of excellent quality by our process at a moderate cost.

What we claim as our invention, and desire to secure by Letters Patent, is—

1. The method herein described of converting cast-iron into malleable iron, by exposing the current of melted metal to a current of electricity.

2. The method herein described of converting cast-iron into malleable iron, by the application of a current of electricity to the current of melted metal, in combination with the application to the metal, while passing through the stack, of a strong blast of hydrogen or oxygen, or both combined.

3. A hearth for a melting-furnace composed of nitrate of soda, charcoal, and lime, substantially as set forth.

4. The combination, substantially as set forth, of a furnace to melt the iron, an insulated ladle to receive the melted metal from the furnace, and a stack through which the metal falls in a stream or shower, with an electric current acting on the falling metal.

5. The combination, substantially as set forth, with the stack, of the adjustable scattering-cone and its electric wire, whereby we are enabled to regulate the length of exposure of the metal to the electric current.

6. The combination, substantially as set forth, with the stack, of the annular blowing-chamber and the blast-orifices, whereby a continued supply of fresh gases is kept up to the falling shower or stream of melted metal.

In testimony whereof we have hereunto subscribed our names.

A. HAMAR.
GEORGE H. SELLERS.

Witnesses:
WM. B. DAYTON,
HENRY BALDWIN, Jr.